Jan. 30, 1962  J. G. IMPARATO  3,018,537
ROD ADJUSTMENT CLAMPS
Filed Sept. 17, 1958
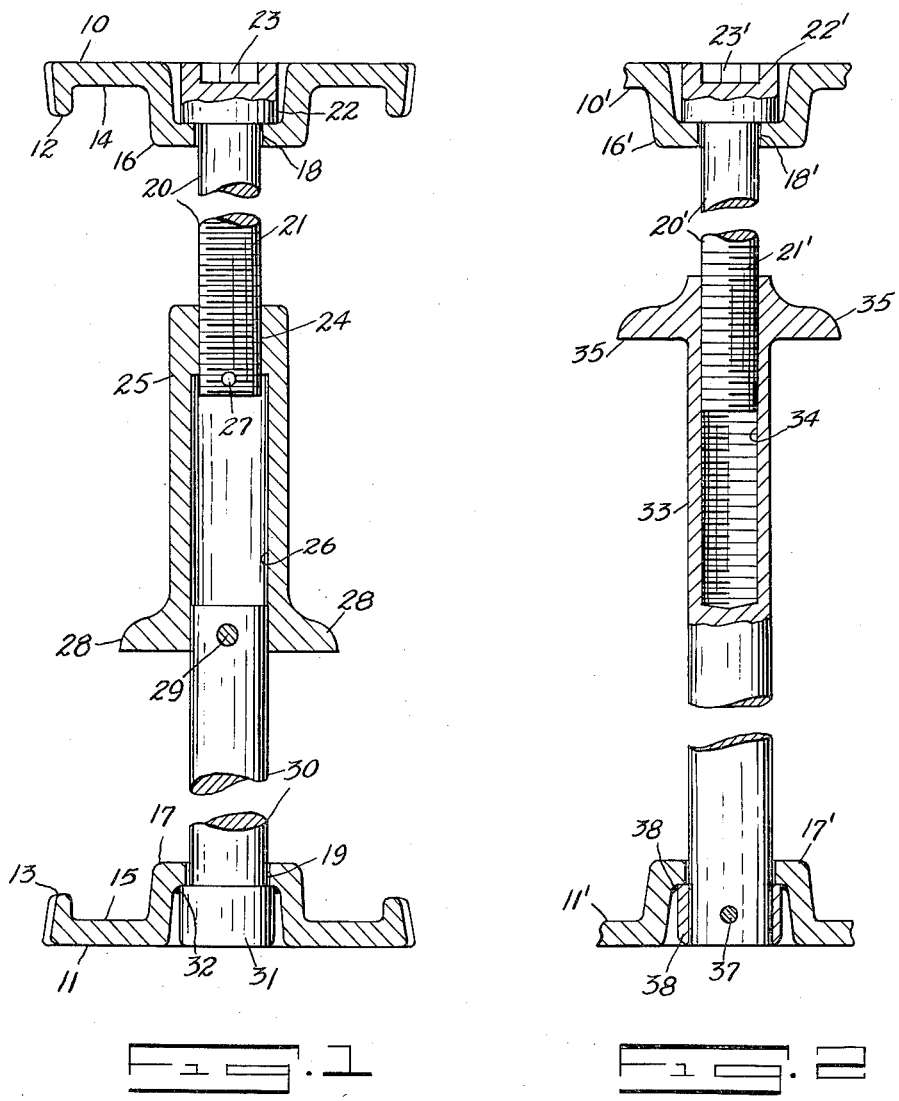
INVENTOR.
JACK G. IMPARATO
BY
*Howard E. Thompson*
ATTORNEY

United States Patent Office 3,018,537
Patented Jan. 30, 1962

3,018,537
ROD ADJUSTMENT CLAMPS
Jack G. Imparato, 1121 82nd St., Brooklyn, N.Y.
Filed Sept. 17, 1958, Ser. No. 761,516
4 Claims. (Cl. 24—263)

This invention relates to what I term rod adjustment clamps, wherein a threaded rod is employed for moving a pair of clamp plates into operative engagement with a pair of articles such, for example, as a pair of drums in coupling said drums in a manner to facilitate unitary handling of the coupled drums.

More particularly, the invention deals with a clamp structure of the character described, wherein a threaded bolt-like member operatively engages one of the plates of the clamp and the other plate includes means coupled therewith for reception of and engagement with the threads of the bolt in operation of moving the pair of clamp plates toward and from each other into operative and inoperative engagement with a pair of articles.

The novel features of the invention will be best understood from the following description, when taken together with the accompanying drawing, in which certain embodiments of the invention are disclosed, and in which the separate parts are designated by suitable reference characters in each of the views, and in which:

FIG. 1 is a longitudinal sectional broken view through one form of clamp which I employ, parts of the construction being shown in elevation; and FIG. 2 is a view, similar to FIG. 1, omitting part of the details of the clamp plates and showing a modified form of construction.

Considering FIG. 1 of the drawing, 10 and 11 illustrate the clamp plates of my improved clamp, these plates having rounded end flanges, as at 12 and 13, respectively, to generally conform with the contour of the articles, such as drums, to be engaged by the plates, ends of the articles engaging the surfaces 14 and 15, respectively, of the plates inwardly of the flanges 12 and 13.

The plates 10 and 11 have, centrally thereof, socket portions 16 and 17, respectively, apertured, as seen at 18 and 19.

Freely rotatable in the aperture 18 is a bolt 20 having an elongated thread, as at 21, the bolt including a head 22 normally housed within the socket 16, the outer surface of the head 22 having a hexagon or other socket 23 for the reception of a tool, not shown, for rotating the bolt 20.

The bolt 20 is in operative engagement with a threaded aperture 24 in one end portion of a coupling sleeve 25, the sleeve having a large diameter bore 26, in which a pin 27, fixed to the lower end of the bolt 20, operates. The pin 27 forms a stop, checking upward movement of the bolt 20, thus preventing displacement of the sleeve 25.

The lower end of the sleeve 25 has extended bearing portions 28 adapted to be engaged by lifting forks in picking up and moving the pair of articles or drums coupled together by the clamp.

Pinned in the lower end of the bore 26 of the sleeve 25, as seen at 29, is a rod 30 having, at its lower end, a head 31 housed within the socket 17 and suitably fixed against rotation in the socket as, for example, by welding, as diagrammatically indicated at 32.

With the structure shown in FIG. 2 of the drawing, the clamp plates are identical with the plates 10 and 11 and are shown only in part at 10' and 11', that is to say, the socket portions 16' and 17' thereof are primarily shown. With this construction, a bolt 20', again generally similar to the bolt 20, is employed having a long threaded portion 21', a head 22' with the hexagon or other socket 23' therein.

In FIG. 2 of the drawing, I have substituted for the sleeve 25 and the rod 30 a single coupling element 33 in the form of an elongated rod, having a threaded socket end 34 for operative engagement with the threads 21' of the bolt 20, said end having flared bearing portions 35, generally similar to the bearing portions 28. The lower end of the rod 33 has a collar 36, pinned or otherwise fixed thereto, as indicated at 37, and, to secure the rod 33 against rotation in the plate 11', a welding, as at 38, is employed, similar to the weld 32.

It will be understood that, in the use of the clamp, as shown in FIGS. 1 and 2, the lower plates, as shown in the drawing, namely the plates 11, 11' are first brought into coupling engagement with the lower portions of articles or drums and the flanges, as, for example at 13, definitely key these plates against rotation on the articles. In this coupling engagement, the upper plates 10, 10' are free to be moved into engagement with the upper ends of the articles or drums with the flanges, as at 12, clearing the articles; whereupon, the bolts 20, 20' are rotated to draw the plates 10, 10' downwardly into firm engagement with the articles and, at the same time, drawing the lower plates 11, 11' into firm engagement with the lower ends of the articles.

By virtue of the bolt coupling of the plates, it will be apparent that a very secure coupling of the plates with the articles is accomplished and, furthermore, the long screw engagement between 20 and 25 and 20' and 33 will adapt a single clamp for operative engagement with articles of different over-all dimensions, while at the same time caring for slight variations in articles presumably of a common size. In this connection, it will appear that clearance is provided in the aperture 18 of the plate 10 and 18' of the plate 10' for tilting of the plate 10, 10' with respect to the bolt 20, 20'.

Having fully described by invention, what I claim as new and desire to secure by Letters Patent is:

1. A clamp of the character described, comprising a pair of flat clamp plates having flanges at side edges thereof extending at right angles to the plates, said plates having central integral socket portions with apertures centrally thereof, said socket portions being of greater depth than said flanges, means adjustable between the plates to control spacing of the plates one with respect to the other, said means comprising a separate member operating in the aperture of the socket of each of said plates, said members having enlarged heads at one end disposed and housed within said sockets for checking displacement of the plates from one end of said members, the head of one member being fixed in its socket, said members having interengaging threaded portions, and the head of the other of said members being rotatable in its socket and including in its outer surface a tool receiving socket facilitating rotation thereof in drawing the plates toward each other.

2. A clamp as defined in claim 1, wherein the first named member comprises a rod, the threaded portion of said rod including a socket portion receiving the second named rod, and the socket portion of said first named rod including laterally extending bearing portions.

3. A clamp as defined in claim 1, wherein the first named member includes an internally threaded sleeve engaged by the threaded portion of the second named member, and the first named member including a rod fixed to said sleeve and projecting therefrom.

4. A clamp as defined in claim 3, wherein said sleeve includes laterally extending bearing portions.

References Cited in the file of this patent

UNITED STATES PATENTS

| | | |
|---|---|---|
| 506,232 | Heysinger | Oct. 10, 1893 |
| 1,724,394 | Chamberlain | Aug. 13, 1929 |
| 1,942,088 | Dietrich | Jan. 2, 1934 |
| 2,319,377 | Wallace et al. | May 18, 1943 |
| 2,778,083 | Imparato | Jan. 22, 1957 |